Sept. 25, 1934.  E. C. HORTON ET AL  1,974,850
AUTOMATIC VALVE MECHANISM
Filed Feb. 11, 1932  2 Sheets-Sheet 1
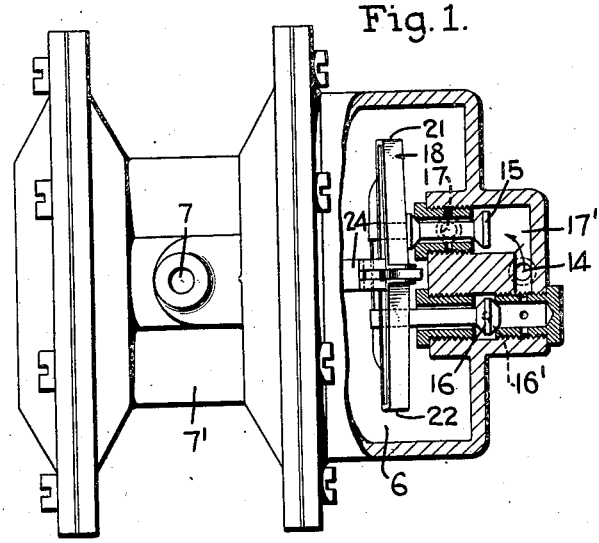
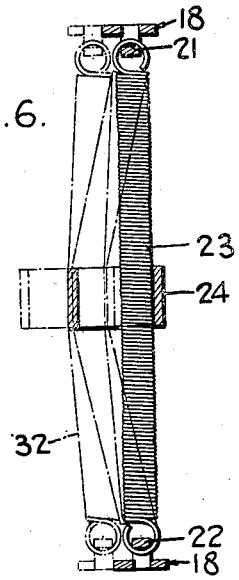
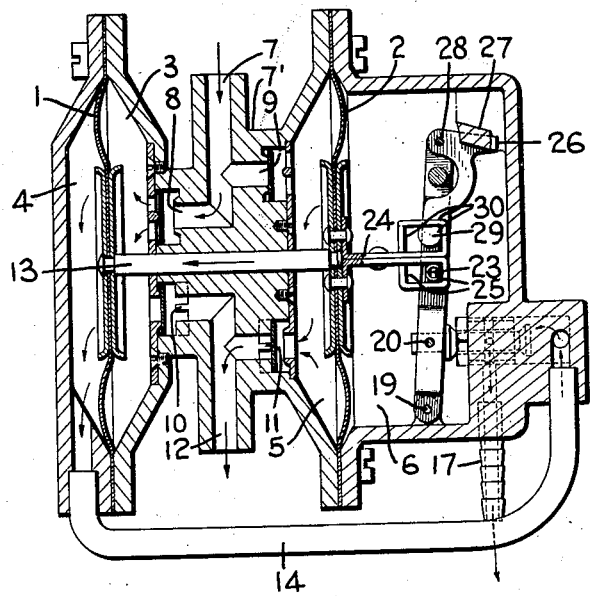
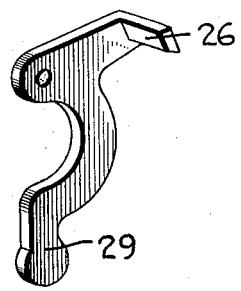
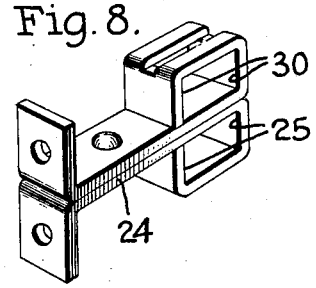
INVENTORS
Erwin C. Horton,
Henry Hueber.
BY
Bean & Brooks. ATTORNEYS Sept. 25, 1934.  E. C. HORTON ET AL  1,974,850
AUTOMATIC VALVE MECHANISM
Filed Feb. 11, 1932   2 Sheets-Sheet 2

INVENTORS
Erwin C. Horton,
Henry Hueber.
BY Bean & Brooks. ATTORNEYS

Patented Sept. 25, 1934

1,974,850

UNITED STATES PATENT OFFICE 1,974,850

AUTOMATIC VALVE MECHANISM

Erwin C. Horton, Hamburg, and Henry Hueber, Buffalo, N. Y., assignors to Trico Products Corporation, Buffalo, N. Y.

Application February 11, 1932, Serial No. 592,422

9 Claims. (Cl. 121—48)

This invention relates to a valve mechanism for fluid operated motors adapted for pumping fuel from the supply tank of a motor vehicle to a carburetor, although the valve mechanism is applicable to fluid pressure motors in general where a definite motor movement or action is desired.

It has heretofore been proposed to provide a fuel pump which is operated from the suction induced in the intake manifold of the motor vehicle engine. This source of suction is a very desirable one in the motor vehicle power plant, but because the degree of negative pressure is restricted and not constant, it has been difficult to provide a suction operated pump that would supply an adequate quantity of fuel sufficient to meet the demands and requirements of the carburetor or engine during the normal operation of the vehicle.

The present invention has for its object to provide an improved valve action and mechanism whereby the motor pump, operating from a source of low pressure, will operate to pump an ample supply of fuel for the demands of the motor vehicle engine. The invention further resides in the provision of a valve action or mechanism which has a definite and predetermined timed movement which permits of a full motor stroke.

In the drawings:

Fig. 1 is an elevation of a motor pump embodying the improved valve mechanism, the latter being shown in section.

Fig. 2 is a longitudinal sectional view through the entire motor pump on a plane at right angles to the plane of section in Fig. 1.

Fig. 6 is a fragmentary sectional view showing particularly the tensioning movement of the spring.

Figs. 7 and 8 are detail perspectives respectively of the latch and latch releasing member of the mechanism.

Figure 3:
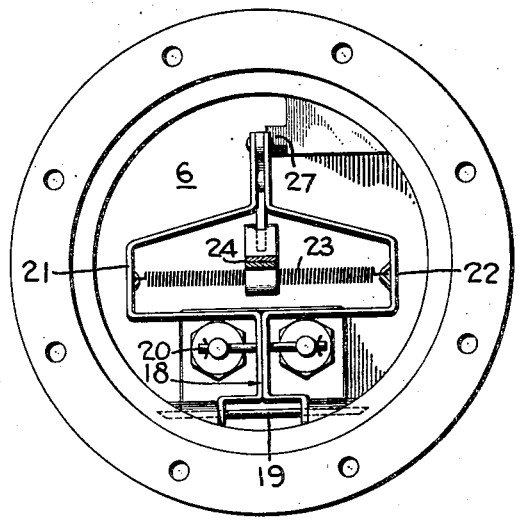
Fig. 3 is an inside plan view of one head of the motor removed to further show the construction of the valve mechanism.

The motor pump illustrating one embodiment of our invention consists of a pair of pumping elements 1 and 2, herein depicted as being of the diaphragm type of piston, which are disposed in the opposite compartments, the diaphragm 1 dividing its compartment into a pumping chamber 3 and a motor chamber 4, while the diaphragm 2 partitions its compartment into a pumping chamber 5 and a motor chamber 6. The two pumping chambers 3 and 5 have a common fuel inlet 7 through the central or intermediate body portion 7' branching through valved inlet ports 8 and 9 into the pump chambers 3 and 5, respectively, so that as the diaphragms move to alternately enlarge their respective pumping chambers the fuel will be taken in through its valved inlet port, and upon a reversal of the diaphragm movement to ensmall the pumping chambers the fuel will be discharged through the proper valved outlet ports 10, 11, which exit through a common outlet 12. The two diaphragms are connected for movement in unison by a link or rod 13 so that as one diaphragm enlarges its pumping chamber the companion diaphragm will ensmall its chamber.

The two motor chambers 4 and 6 are interconnected by a conduit 14 and interposed valve means consisting of a suction or operating pressure valve 15 and an atmospheric valve 16. The suction valve 15 connects the suction supply passage 17 alternately with the motor chambers 4 and 6, while at the same time communication between the unconnected chamber and the atmosphere is established by means of the valve 16, the conduit 14 communicating with the two valves through a common passage 17'. The atmosphere port is indicated at 16'.

The valve mechanism comprises an open frame-like lever or actuator 18 which is fulcrumed on a pivot pin 19 within the chamber 6, and to which the projecting stems of the valves 15 and 16 are connected by a transverse pin 20. The lever is herein shown as having spaced spring supports 21 and 22 between which a coil spring 23 is stretched, and to the central or intermediate portion of this spring is connected a bracket or latch releasing member 24 carried by the adjacent motor or pumping element 2 so that as the latter is reciprocated in its chamber the bracket 24 will bow such central portion laterally first to one side and then to the other side of the longitudinal axis of the spring. Thereby the spring is placed under a tension which is gradually built up by and during movement of the pumping element until the lever 18 is free to follow along whereupon the tensioned spring will act to quickly pull the lever and shift the valves 15 and 16 from one operative position to the other operative position. To increase the length of the stroke of the pumping elements, the spring 23 may be connected to the bracket by a play connection, such as by disposing the spring between a pair of spaced shoulders 25 designed to alternately engage the spring at its intermediate portion, subsequent to an idle interval, and flex it to one side or the other of its major axes.

The source of suction used for the operation of this motor pump is preferably taken from the intake manifold as a source of suction, which source of suction is variable in accordance with the position of the engine throttle. When the suction is light, as when the engine is being accelerated, the spring tension may be sufficient at that moment to counteract the correspondingly light valve adhesion even though the pistons may not have completed their full movement and thereby cause a shift of the valves short of the complete stroke of the motor pump.

Figure 4:
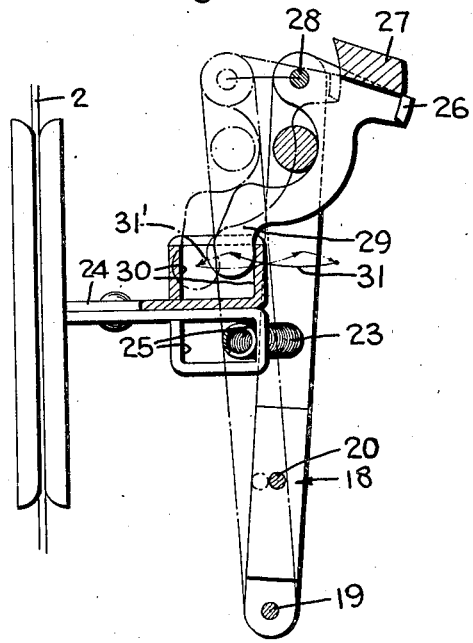
Fig. 4 is a fragmentary sectional view depicting the valve action in one position just prior to its release for movement to its opposite position.

To insure a full piston stroke, we provide means for temporarily arresting the action of the valve mechanism and releasing the same at a definite point in the piston stroke. To this end the lever may be provided with a latch 26 for engaging a stop member 27 fixed within the chamber 6. This latch is pivoted at 28 on the lever and has an actuating arm 29 projecting between a pair of shoulders 30 on the latch releasing member 24. Assuming that the pumping element 2 is moving toward the left in Fig. 4 while the latch 26 remains engaged with the stop member 27, the trailing shoulder 30 will move the actuating end 29 of the latch about the pivoting axis 28 along a path substantially as indicated by the solid arrow 31. Now, when the latch 26 rides off the stop lug 27 the tensioned spring 23 will quickly snap the lever 18 to the dot and dash line position in Fig. 4 and the actuating end 29 will be moved along arrow 31'.

Figure 5:
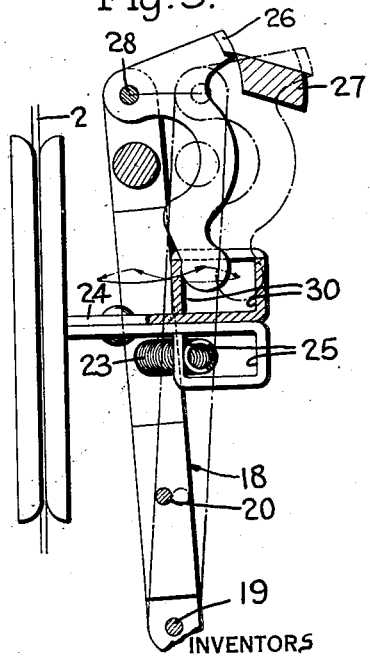
Fig. 5 is a similar view showing the valve action in such opposite position immediately prior to its release for return movement to its first position.

Such movement of the lever 18 will change the position of the valves 15 and 16 to connect the source of suction to the chamber 6 and the atmosphere to the chamber 4 and thereby reverse the direction of movement of the pumping elements moving to the right so that the actuating end 29 will be engaged by the opposed shoulder 30 to move the latch 26 into engagement with the lug 27. This positively holds the lever 18 in this position regardless of whether or not the spring is tensioned sufficiently to counteract the adhesion of the valves to their seats. Therefore, as the pumping elements continue to move toward the right the spring will be engaged by the opposite shoulder 25 and be bowed to the opposite side to place the same under tension while the lever is held arrested. As this rightward movement of the pumping elements continues (Fig. 5) the latch 26 will be moved across the face of the stop lug 27 until it rides off the upper edge thereof whereupon the fully tensioned spring 23 will again function to shift the lever.

This will again shift the valves to apply suction to the chamber 4 and atmospheric pressure to the chamber 6, reversing the direction of the pumping elements and causing the trailing shoulder 30 to engage the actuating end 29 of the latch lever to bring the latch part 26 into arresting engagement with the stop lug 27. It will be observed that this arresting engagement is made preliminary to the tensioning of the spring and is maintained throughout the entire tensioning of the spring. Therefore, since the latch controls the valve action and determines the moment at which the valves are to be shifted it will be noted that this moment has a definite relation with the travel of the pumping elements and determines the length of their strokes. The release is effected by and during movement of such pumping elements. Consequently, the valve shifting action occurs at the same interval during the piston travel, always becomes effective at approximately the same point in the piston travel, and thereby renders full and complete the piston stroke before reversal thereof.

What is claimed is:

1. In a valve action for fluid motors having a movable element operating under fluid pressure in a chamber having an outlet port and an inlet port, valve means movable back and forth between two positions for operatively controlling the action of the fluid pressure on the element, and mechanism for operating said valve means comprising a lever connected to the valve means for moving the same back and forth to the two positions, resilient means connecting the lever to the movable element and tensionable by and during movement of the latter to snap the valve means from one position to the other, means for arresting the lever during such tensioning movement of the element, a fixed stop, said arresting means including a part engageable with the stop, said part being bodily movable with the lever and movably carried thereby to engage and disengage the stop, and means operable by and during movement of the element to free the arrested lever from the stop and thereby permit the function of the resilient means.

2. A valve action for fluid motors having a reciprocating element, comprising valve means movable between two positions for operatively controlling the admission to the motor of the operating fluid pressure, movable resilient means connecting the valve means to said reciprocating element and including a resilient member tensionable by and during movement of the latter to snap the valve means from one position to the other, an arresting part, means carried by and movable with the movable means for engaging said part to hold the valve means against movement, and means operable by and during movement of said reciprocating element to disengage said holding means from said arresting part and thereby permit the resilient means to function.

3. A valve action for fluid motors, comprising, in combination with a reciprocating part of the motor, valve means for operatively admitting fluid pressure to the motor, a lever connected to the valve means for operating the same, resilient means connecting the lever to said motor part and tensionable by and during movement of the latter to move said valve means, means carried by the lever and engageable with a stop member for holding the lever during the tensioning of the resilient means, and means carried by the lever for being engaged by said reciprocating part of the motor and movable thereby for disengaging the holding means to release the lever.

4. A valve action for fluid motors, comprising, in combination with a reciprocating part of the motor, valve means for operatively admitting fluid pressure to the motor, a lever connected to the valve means for operating the same, resilient means connecting the lever to said motor part and tensionable by and during movement of the latter, to move said valve means, a stop member, a lever pivoted on said first lever and having one end portion for engaging the stop member to hold the first lever during the tensioning of said resilient means, and means carried by said motor part and operable by and during movement thereof to engage another portion of the second lever to move the latter for disengaging said end portion from the stop member and thereby release the first lever for being snapped over in a valve actuating movement.

5. A valve action for fluid motors, comprising, in combination with a reciprocating part of the motor, valve means for operatively admitting fluid pressure to the motor, a lever connected to the valve means for operating the same, resilient means connecting the lever to said motor part and tensionable by and during movement of the latter, to move said valve means, a stop member, a latch movably mounted on the lever for engaging the stop member to hold the lever during the tensioning of said resilient means, and a play connection between said motor part and the latch and operable to move the latter on the lever and thereby disengage the latch from the stop member after a predetermined tensioning movement of said motor part.

6. A valve action for fluid motors, comprising, in combination with a reciprocating part of the motor, valve means for operatively admitting fluid pressure to the motor, a lever connected to the valve means for operating the same, resilient means connecting the lever to said motor part and tensionable, by and during movement of the latter, to move said valve means, a stop member, a latch pivoted on the lever and having one end engageable with the stop member, and a pair of shoulders movable with the motor part, the opposite end of the latch being disposed between the shoulders to be alternately engaged thereby for disengaging the latch from the stop member.

7. A valve action for fluid motors, comprising a motor part movable back and forth, valve means for operatively admitting fluid pressure to the motor, actuator means for the valve means connected thereto, a resilient member supported at its opposite ends by said actuator means with the intermediate portion being free, said motor part having spaced shoulders between which the free intermediate portion of said resilient member is disposed, for being alternately acted upon by the shoulders to tension the spring first to one side and then to the other side of its normal axis whereby said valve means is placed under an urge to move intermittently back and forth between two positions, means for arresting one of said first two named means until said resilient member is tensioned predeterminedly, and means operable by said motor part for rendering said arresting means inoperative.

8. A valve action for fluid motors, comprising a motor part movable back and forth, valve means for operatively admitting fluid pressure to the motor, actuator means for the valve means connected thereto, a resilient member supported at its opposite ends by said actuator means with the intermediate portion being free, said motor part having spaced shoulders between which the free intermediate portion of said resilient member is disposed, for being alternately acted upon by the shoulders to tension the spring first to one side and then to the other side of its normal axis whereby said valve means is placed under an urge to move intermittently back and forth between two positions, a stop member, a lever mounted on said actuator means and having a portion movable into and out of engagement with said stop member to intermittently arrest said valve means while said resilient member is being tensioned, and a play connection between said lever and said motor part and cooperating with both said resilient member and said motor part for successively moving said lever portion from engagement with one side of said stop member and into engagement with the opposite side of said stop member subsequent to an intervening movement of said actuator means by said resilient member.

9. A valve action for fluid motors comprising a motor part movable back and forth, valve means movable back and forth between two operative positions for operatively admitting fluid pressure to the motor to effect operation of said motor part, actuator means for the valve means connected thereto, resilient means operatively connecting said actuator means to said motor part and adapted to be placed under tension by the latter first upon movement of said motor part in one direction and then upon reverse movement of said motor part, stop means, arresting means movably carried by said actuator means for engagement with said stop means in both positions of said valve means, and a play connection between said arresting means and said motor part and cooperating both with said motor part and with said resilient means for first disengaging said arresting means from said stop means and then re-engaging said arresting means with said stop means subsequent to an intervening movement of said valve means and prior to the initiation of a return movement of said motor part.

ERWIN C. HORTON.
HENRY HUEBER.